United States Patent [19]
Lister

[11] Patent Number: 5,819,687
[45] Date of Patent: Oct. 13, 1998

[54] WILDLIFE FEEDING DEVICE

[76] Inventor: Jackie L. Lister, P.O. Box 332, Creola, Ala. 36525

[21] Appl. No.: 783,276

[22] Filed: Jan. 15, 1997

[51] Int. Cl.$^6$ ...................................................... A01K 5/00
[52] U.S. Cl. ......................................... 119/52.1; D30/121
[58] Field of Search ............................... 119/51.01, 52.1, 119/52.2, 52.3, 54, 51.04, 57.8, 57.9, 57.91, 61; D30/121, 122, 125, 131, 132, 133

[56] References Cited

U.S. PATENT DOCUMENTS

| | | | |
|---|---|---|---|
| D. 381,777 | 7/1997 | Tuck | D30/121 |
| 1,916,570 | 7/1933 | Heider | 110/51.01 |
| 2,972,334 | 2/1961 | Braden | 119/54 |
| 3,034,480 | 5/1962 | French | 119/56 |
| 3,195,508 | 7/1965 | Lehman et al. | 119/51.11 |
| 3,780,701 | 12/1973 | Wentworth | 119/51 R |
| 4,945,859 | 8/1990 | Churchwell | 119/57.91 |
| 5,022,349 | 6/1991 | Bryant et al. | 119/57.8 |
| 5,272,829 | 12/1993 | Roberts et al. | 119/61 |

*Primary Examiner*—John S. Hilten
*Assistant Examiner*—Amanda B. Sandusky
*Attorney, Agent, or Firm*—Joseph N. Breaux

[57] ABSTRACT

A wildlife feeding device including a tree stump shaped base and a screw on tree stump top shaped lid member. The tree stump shaped base has a feed storage compartment, a feed discharge opening formed along a bottom edge of the feed storage compartment, and a feed chute provided within the feed compartment that has an angled surface that in combination with the force of gravity urges the feed in the feed compartment toward the feed discharge opening. The exterior surface of the stump shaped base is provided with a plurality of branch attachment holes into which the ends of a number of branches from surrounding trees and bushes can be inserted to assist in making the wildlife feeder blend in with the surrounding vegetation. The exterior of the screw on lid member is preferably provided with a raised perimeter edge that defines an attractant holding depression and the raised perimeter edge is provided with at least one drip notch formed in a manner such that a liquid positioned within the attractant holding depression is dribbled out of the drip notch onto the sidewall of the stump shaped base.

16 Claims, 2 Drawing Sheets

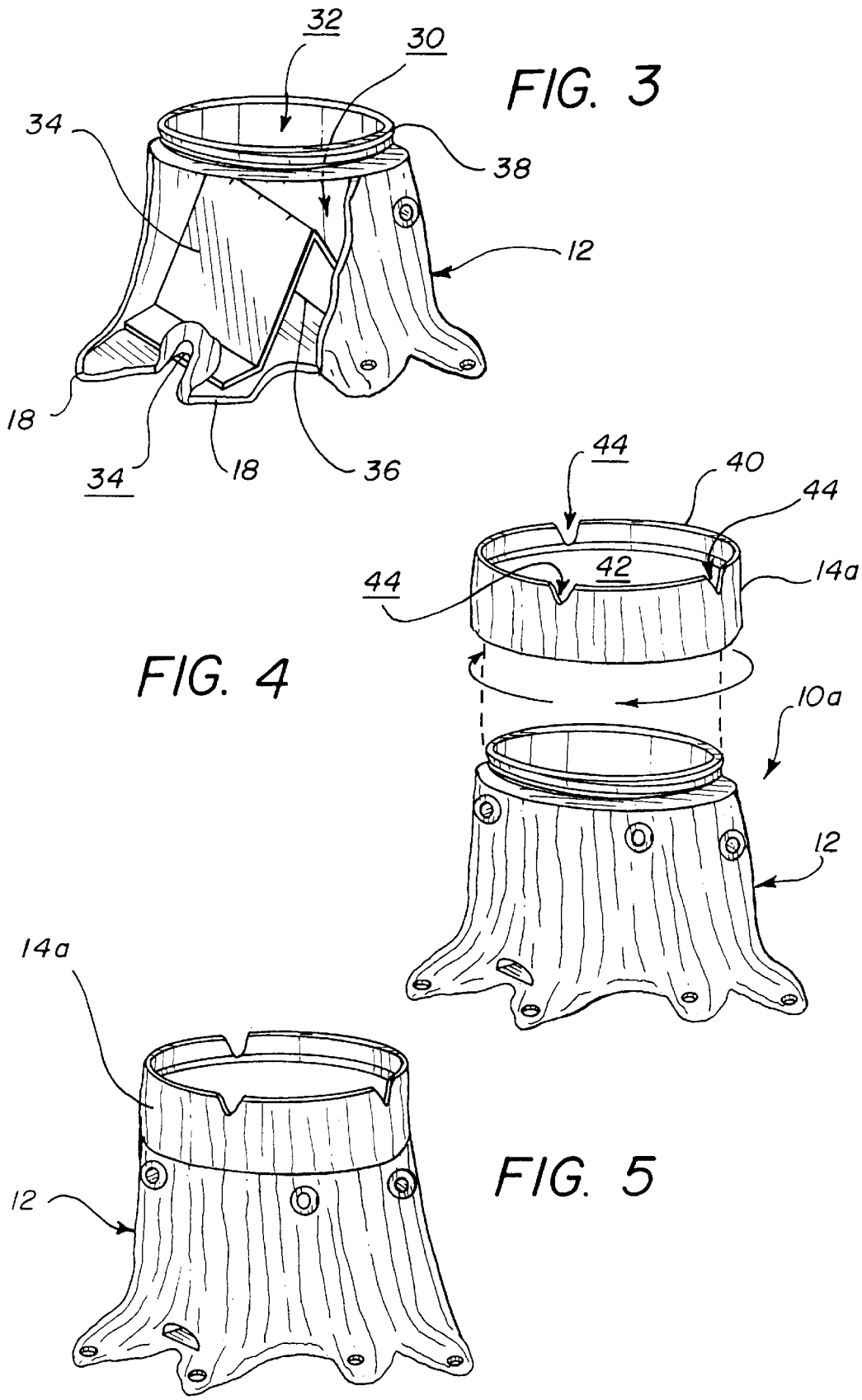

WILDLIFE FEEDING DEVICE

TECHNICAL FIELD

The present invention relates to feeding devices for animals and more particularly to a wildlife feeding device having a tree stump shaped base having a bottom edge defining a number of root shaped projections between two of which at least one feed discharge opening is provided; a feed storage compartment, defined within the stump shaped base; and a top opening for inserting feed into the feed storage compartment. The feed storage compartment is in connection with the at least one feed discharge opening along the bottom surface thereof. A feed chute is provided within the feed storage compartment. The feed chute is provided with an angled surface that is directed toward the feed discharge opening in a manner such that feed positioned within the feed storage compartment is urged by gravity in a direction toward the feed opening. A plurality of branch attachment holes are formed into an exterior surface of the stump shaped base for receiving a number of natural tree branches. A screw on lid member is also provided with the wildlife feeding device. The lid member has the general appearance of a tree stump top and is securable to the stump shaped base in a manner to cover the top opening. The stump shaped base is anchored to the ground using a number of anchoring spikes inserted through anchoring apertures that are formed through the root projections and into the ground. In a preferred embodiment, the lid member is provided with a raised perimeter edge that defines an attractant holding depression. The raised perimeter edge preferably has at least one drip notch formed thereinto in a manner such that a liquid positioned within the attractant holding depression is dribbled out of the drip notch onto the sidewall of the stump shaped base.

BACKGROUND OF THE INVENTION

It is often desirable when attempting to attract wildlife to a particular area for viewing and or hunting to place feed and other attractants out for the wildlife. In some instances the wildlife is cautious of the area surrounding the feeding device and can actually be driven from the area by fear of the feeding device itself. It would be desirable, therefore, to have a wildlife feeding device that blends in with the natural surroundings of the area to which it is desired to attract the wildlife. Because, more than one attractant mechanism can often provide better results than any single attractant mechanism alone, it would be a further benefit to have a wildlife feeding device that included structures for dispensing more than one type of animal attractant at a time.

SUMMARY OF THE INVENTION

It is thus an object of the invention to provide a wildlife feeding device that blends in with the natural surroundings of the area to which it is desired to attract the wildlife.

It is a further object of the invention to provide a wildlife feeding device that includes structures for dispensing more than one type of animal attractant at a time.

It is a still further object of the invention to provide a wildlife feeding device that accomplishes both of the above objects in combination.

Accordingly, a wildlife feeding device is provided. The wildlife feeding device includes a tree stump shaped base and a screw on tree stump top shaped lid member. The tree stump shaped base has a feed storage compartment defined therein that is accessible through a top opening for inserting feed therein and a feed discharge opening formed along a bottom edge thereof for discharging feed from the feed compartment through feed discharge opening to the area adjacent the bottom edge of the tree stump shaped base. The exterior of the tree stump shaped base is provided with a plurality of root projections extending out away from the base portion to provide stability to the base. Each root projection is provided with an anchoring aperture. The stump shaped base is anchored in place by driving a spike through each of the anchoring apertures and into the ground. The feed discharge opening is preferably provided between two adjacent root projections to provide a natural location where wildlife is accustomed to finding food. To aid in moving the feed from the feed storage compartment out through the feed discharge opening a feed chute is provided within the feed compartment that has an angled surface that in combination with the force of gravity urges the feed in the feed compartment toward the feed discharge opening. When more than one feed discharge opening is provided, a feed chute having multiple angled surfaces is provided for dividing the feed compartment into multiple sections wherein each angled surface directs feed toward and out of one of the feed discharge openings. The exterior surface of the stump shaped base is provided with a plurality of branch attachment holes into which the ends of a number of branches from surrounding trees and bushes can be inserted to assist in making the wildlife feeder blend in with the surrounding vegetation. The exterior of the screw on lid member has the general appearance of a tree stump top and is securable to the stump shaped base in a manner to cover the top opening. In a preferred embodiment the lid member is provided with a raised perimeter edge that defines an attractant holding depression and the raised perimeter edge is provided with at least one drip notch formed in a manner such that a liquid positioned within the attractant holding depression is dribbled out of the drip notch onto the sidewall of the stump shaped base.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 3 is a partial cutaway view of the stump shaped base in isolation showing the feed chute dividing the feed compartment into two feed storage sections within the feed storage chamber and one of the two feed discharge openings.

FIG. 4 is a perspective view of a second exemplary embodiment of the wildlife feeding device of the present invention showing a second exemplary screw on stump lid member with a salt/scent holding depression formed into a top surface of the screw on lid member and three drip notches formed into the raised perimeter edge of the stump lid member.

FIG. 5 is a perspective view of the second exemplary wildlife feeding device of FIG. 4 with the screw on lid member screwed down onto the stump shaped base.

DESCRIPTION OF THE EXEMPLARY EMBODIMENT

Figure 1:
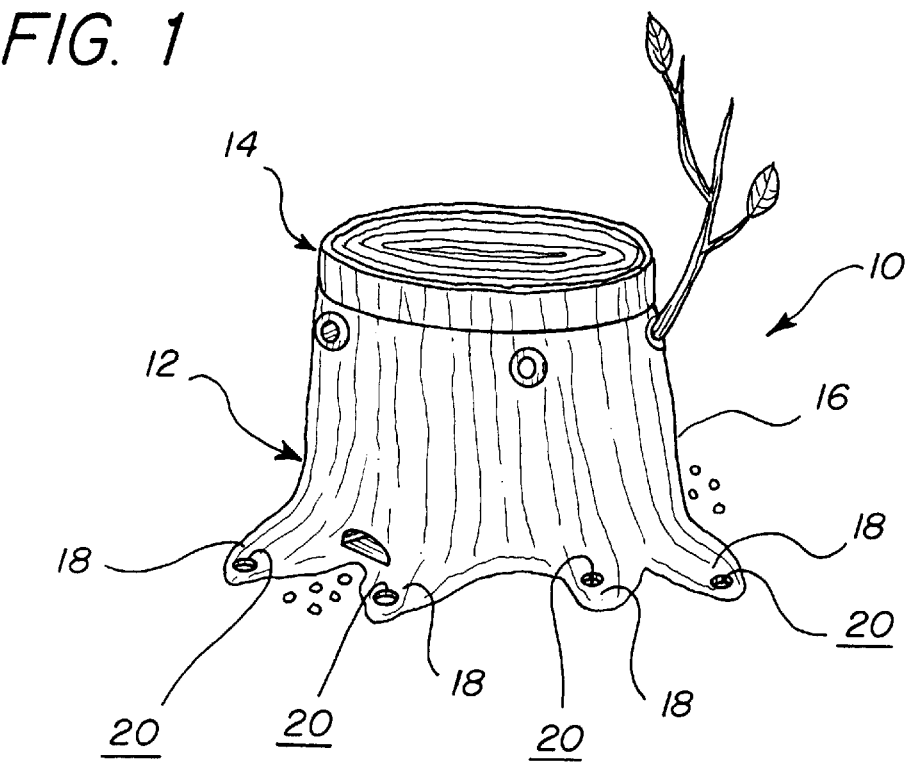
FIG. 1 is a perspective view of a first exemplary embodiment of the wildlife feeding device of the present invention showing the stump shaped base, the feed discharge openings at the bottom of the stumped shaped base, the branch attachment holes formed into the side of the stump shaped base, and the screw on lid member.

FIG. 1 shows a first exemplary embodiment of the wildlife feeding device of the present invention generally designated by the numeral 10. Feeding device 10 includes a tree stump shaped base, generally designated 12, and a screw on tree stump top shaped lid member, generally designated 14. Tree stump shaped base 12 is molded from plastic and has an exterior surface 16 molded to resemble tree bark. In this embodiment a number of root projections 18 extend outwardly from the bottom edge of tree stump shaped base 12. Each root projection 18 is provided with an anchoring aperture 20 through which a stake can be driven to anchor tree stump shaped base 12 to the ground in a desired location.

Figure 2:
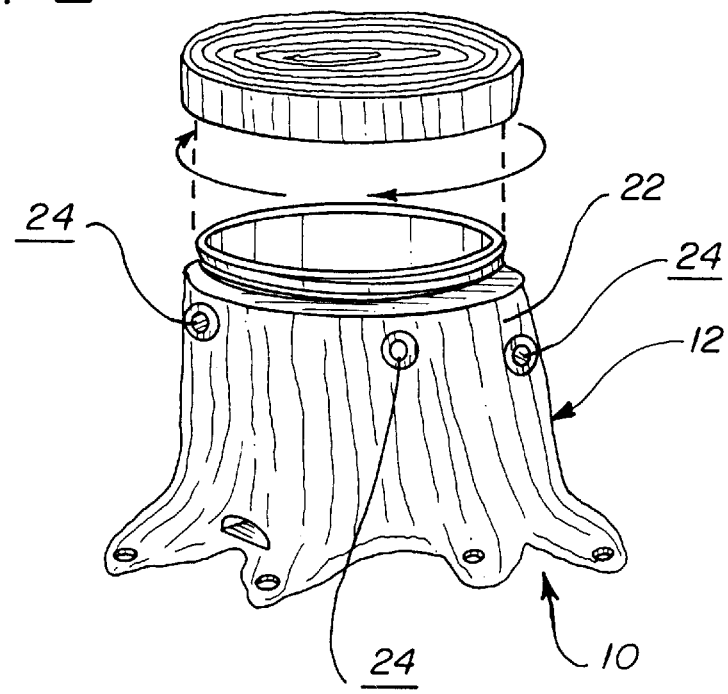
FIG. 2 is a perspective view showing the screw on lid member screwed off of the stump shaped base.

With reference to FIG. 2, the exterior surface 16 of tree stump shaped base 12 is provided with a number of branch attachment holes 24 into each of which the end of a branch from surrounding tree and bush can be inserted to assist in making wildlife feeder device 10 blend in with the surrounding vegetation.

With reference to FIG. 3, tree stump shaped base 12 has a feed storage compartment 30 defined therein that is accessible through a top opening 32 for inserting feed attractive to wildlife into feed storage compartment 30, and a feed discharge opening 34 formed along a bottom edge of tree stump shaped base 12 and positioned between two adjacent root projections 18. An A-shaped feed chute 36 having an angled surface 35 is provided within feed compartment 30. Angled surface 35 is arranged in relation to feed discharge opening 34 in a manner such that angled surface 35 in combination with the force of gravity urges feed positioned within feed compartment 30 toward and out of feed discharge opening 34. Also shown in the figure is the threaded lip 38 of tree stump shaped base 12 onto which the internally threaded lip of lid member 14 is screwed.

FIG. 4 shows a second exemplary embodiment of the wildlife feeding device of the present invention generally designated by the numeral 10a. In this embodiment, Wildlife feeding device 10a is identical to wildlife feeding device 10 except for lid member 14a. In the embodiment, lid member 14a is provided with a raised perimeter edge 40 that defines an attractant holding depression 42 into which wildlife attractants such as salt water and sugar syrup can be placed. To aid in dispersal of the wildlife attractant, three notches 44 are provided into raised perimeter edge 40 to allow the wildlife attract to dribble onto the sidewall of stump shaped base 12. FIG. 5 shows lid member 14a screwed down onto stump shaped base 12 as previously described.

It can be seen from the preceding description that a wildlife feeding device has been provided that blends in with the natural surrounding of the area to which it is desired to attract the wildlife and that includes structures for dispensing more than one type of animal attractant at a time.

It is noted that the embodiment of the wildlife feeding device described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A wildlife feeding device comprising:

a tree stump shaped base having a feed storage compartment defined therein that is accessible through a top opening defined by a threaded lip and a first feed discharge opening formed along a bottom edge of said tree stump shaped base for discharging feed from said feed compartment through said first feed discharge opening to an area adjacent said bottom edge of said tree stump shaped base, said tree stump shaped base being provided with a plurality of root projections extending out away from a base portion, of said tree stump shaped base, each root projection being provided with an anchoring aperture;

a feed chute provided within said feed compartment, said feed chute having an angled surface that in combination with the force of gravity urges feed positioned within said feed compartment toward said first feed discharge opening; and a screw-on tree stump top shaped lid member, said tree stump top shaped lid member having an internally threaded portion threadable onto said threaded lip of said tree stump shaped base.

2. The wildlife feeding device of claim 1, wherein:

said first feed discharge opening is provided between two adjacent root projections.

3. The wildlife feeding device of claim 1, further including:

a second feed discharge opening; and wherein said feed chute is A-shaped and provided with a first and a second angled surface.

4. The wildlife feeding device of claim 1 wherein:

said tree stump shaped base has an exterior surface provided with a plurality of branch attachment holes.

5. The wildlife feeding device of claim 1 wherein:

said screw-on lid member has a raised perimeter edge that defines an attractant holding depression; and said raised perimeter edge is provided with at least one drip notch formed in a mariner such that a liquid positioned within said attractant holding depression is dribbled out of said drip notch onto said tree stump shaped base.

6. The wildlife feeding device of claim 2, further including:

a second feed discharge opening; and wherein said feed chute is A-shaped and provided with a first and a second angled surface.

7. The wildlife feeding device of claim 2 wherein:

said tree stump shaped base has an exterior surface provided with a plurality of branch attachment holes.

8. The wildlife feeding device of claim 2 wherein:

said screw-on lid member has a raised perimeter edge that defines an attractant holding depression; and said raised perimeter edge is provided with at least one drip notch formed in a manner such that a liquid positioned within said attractant holding depression is dribbled out of said drip notch onto said tree stump shaped base.

9. The wildlife feeding device of claim 6 wherein:

said tree stump shaped base has an exterior surface provided with a plurality of branch attachment holes.

10. The wildlife feeding device of claim 6 wherein:

said screw-on lid member has a raised perimeter edge that defines an attractant holding depression; and said raised perimeter edge is provided with at least one drip notch formed in a manner such that a liquid positioned within said attractant holding depression is dribbled out of said drip notch onto said tree stump shaped base.

11. The wildlife feeding device of claim 9 wherein:

said screw-on lid member has a raised perimeter edge that defines an attractant holding depression; and said raised perimeter edge is provided with at least one drip notch formed in a manner such that a liquid positioned within said attractant holding depression is dribbled out of said drip notch onto said tree stump shaped base.

12. The wildlife feeding device of claim 7 wherein:

said screw-on lid member has a raised perimeter edge that defines an attractant holding depression; and said raised perimeter edge is provided with at least one drip notch formed in a manner such that a liquid positioned within said attractant holding depression is dribbled out of said drip notch onto said tree stump shaped base.

13. The wildlife feeding device of claim 3 wherein:

said tree stump shaped base has an exterior surface provided with a plurality of branch attachment holes.

14. The wildlife feeding device of claim 3 wherein:

said screw-or lid member has a raised perimeter edge that defines an attractant holding depression; and said raised perimeter edge is provided with at least one drip notch formed in a manner such that a liquid positioned within said attractant holding depression is dribbled out of said drip notch onto said tree stump shaped base.

15. The wildlife feeding device of claim 13 wherein:

said screw-on lid member has a raised perimeter edge that defines an attractant holding depression; and said raised perimeter edge is provided with at least one drip notch formed in a manner such that a liquid positioned within said attractant holding depression is dribbled out of said drip notch onto said tree stump shaped base.

16. The wildlife feeding device of claim 4 wherein:

said screw-on member has a raised perimeter edge that defines an attractant holding depression; and said raised perimeter edge is provided with at least one drip notch formed in a manner such that a liquid positioned within said attractant holding depression is dribbled out of said drip notch onto said tree stump shaped base.

* * * * *